United States Patent [19]

Perusse et al.

[11] Patent Number: 4,881,023
[45] Date of Patent: Nov. 14, 1989

[54] HYBRID HIGH SPEED VOLTAGE REGULATOR WITH REDUCTION OF MILLER EFFECT

[75] Inventors: Eugene T. Perusse, San Diego; Eugene L. Hammer, Fullerton, both of Calif.

[73] Assignee: Hughes Aircraft Company, Los Angeles, Calif.

[21] Appl. No.: 349,876

[22] Filed: May 9, 1989

Related U.S. Application Data

[63] Continuation of Ser. No. 164,281, Mar. 4, 1988, abandoned.

[51] Int. Cl.[4] ............................................. G05F 1/563
[52] U.S. Cl. ..................................... 323/266; 323/273; 323/282
[58] Field of Search ............... 323/266, 268, 273, 280, 323/281, 285, 288, 290, 351; 307/108

[56] References Cited

U.S. PATENT DOCUMENTS

| | | | |
|---|---|---|---|
| 3,284,692 | 11/1966 | Gautherin | 323/268 |
| 3,443,203 | 5/1969 | Krayenbrink | 323/266 |
| 4,035,710 | 7/1977 | Joyce | 363/37 |
| 4,127,885 | 11/1978 | Adam et al. | 361/18 |
| 4,127,886 | 11/1978 | Easter | 361/18 |
| 4,129,819 | 12/1978 | Arendt | 322/28 |
| 4,375,614 | 3/1983 | Steiner | 323/280 |
| 4,521,678 | 6/1985 | Winter | 235/472 |
| 4,560,918 | 12/1985 | Callen | 323/281 |
| 4,634,954 | 1/1987 | Kato et al. | 322/28 |
| 4,679,130 | 7/1987 | Moscovici | 323/266 |

FOREIGN PATENT DOCUMENTS 34217  2/1982  Japan .................................. 323/270

OTHER PUBLICATIONS

Mumaw, "Programmable Regulator Card," IBM Tech. Discl. Bul., vol. 20, No. 6, p. 2180, Nov. 1977.

Primary Examiner—William H. Beha, Jr.
Attorney, Agent, or Firm—Wanda K. Denson-Low

[57] ABSTRACT

A linear regulator employing a field effect transistor (FET) pass element to supply a pulsed load is programmed by a cooperating switching regulator such that an increased voltage differential is maintained across the FET to reduce response time during the leading edge of the load pulse and to thereafter reduce the voltage differential to achieve reduced power consumption and increased efficiency during the remainder of the load pulse.

19 Claims, 7 Drawing Sheets

HYBRID HIGH SPEED VOLTAGE REGULATOR WITH REDUCTION OF MILLER EFFECT

This application is a continuation of application Ser. No. 164,281, filed Mar. 4, 1988, now abandoned.

BACKGROUND OF THE INVENTION

1. Field of the Invention

The subject invention relates to voltage regulators and more particularly to voltage regulators for use in pulsed systems such as pulsed radars.

2. Description of Related Art

Pulsed systems such as pulsed radars present a highly dynamic load to power conversion and regulating systems. In order to meet the system stability requirements of proposed radars using solid state RF amplifiers, it is anticipated that the bias voltages to the transistors of such solid state amplifiers will have to be very stable, i.e., well regulated. Analysis has shown that it is very desirable to provide the required regulation at the point of use.

Present systems lack the ability to provide highly stable bias voltages in a cost and power efficient manner. In the prior art, large capacitor banks have been employed to meet the voltage stability requirements of dynamic loads in radar. The size and weight of systems employing such capacitor banks increase directly with increased performance requirements. The type and number of capacitors required in such systems lowers system reliability. Capacitor banks must also be distributed across the antenna when distributed RF power stages are employed on the antenna, which imposes undesirable volume and weight penalties on the antenna.

The prior art has also employed linear regulators in radar power supply systems. Such prior art linear regulators have been low in efficiency and have still required large capacitor banks. The size of the capacitor banks is a trade-off against efficiency. Maintaining response time and stability of prior art systems employing linear regulators also requires complicated drive circuitry for the pass element of the linear regulator.

One measure of a regulation system's stability is the time required for the system to return to its steady state or at-rest condition after the system has been perturbed by external (or internal) causes, i.e., transient response. An example of such a perturbation is the pulsed or dynamic loading presented to a power converter by a pulsed radar. With respect to a linear regulator, stability may be measured by the time it takes for the output voltage of the linear regulator to return to its steady state value after a step change in load current, such as a step from a no load to a full load condition. Where linear regulators employ field effect transistors, the so-called Miller Effect increases the time it takes the linear regulator's output voltage to return to its steady state value after a load current change and hence impairs the stability of the system.

SUMMARY OF THE INVENTION

It is therefore an object of the invention to provide an improved voltage regulator;

It is another object of the invention to improve voltage regulators for use with pulsed systems, including pulsed radars;

It is another object of the invention to provide a voltage regulator which exhibits improved stability at a higher efficiency and lower cost than prior art approaches;

It is another object of the invention to reduce the impairment of performance by the Miller Effect in a voltage regulator employing a linear regulator having a transistor pass element.

According to the invention, two voltage regulators are cascaded between a power source and a load. The first or input voltage regulator is programmed to reduce performance degrading parasitic effects of the second voltage regulator. Performance is improved by a reduction in response time and accompanying increase in stability. The importance of the improvements obtainable in this manner increases as the magnitude and speed of load current changes increase because the adverse effect of parasitics also increases with the magnitude and speed of load current changes.

In a preferred embodiment, the input voltage regulator is a programmed switching regulator and the second voltage regulator cascaded with it is a linear regulator. The fast response to dynamic load impedance changes of the linear regulator is enhanced by the programming of the switching regulator. The programming of the switching regulator reduces the degrading effects on the performance of the linear regulator caused by stray or parasitic series inductance and the internal and stray capacitances associated with a series regulating element such as a field effect transistor (FET). In a particular embodiment employing a FET as the pass element of the linear regulator, the parasitic Miller Effect is reduced by maintaining a high differential voltage between the drain and source of the FET during the leading edge of a load pulse and thereafter programming down the voltage at the input of the linear regulator in order to conserve power and increase efficiency.

BRIEF DESCRIPTION OF THE DRAWINGS

The just summarized invention will now be described in detail in conjunction with the drawings of which.

DETAILED DESCRIPTION OF THE PREFERRED EMBODIMENT

Figure 1:
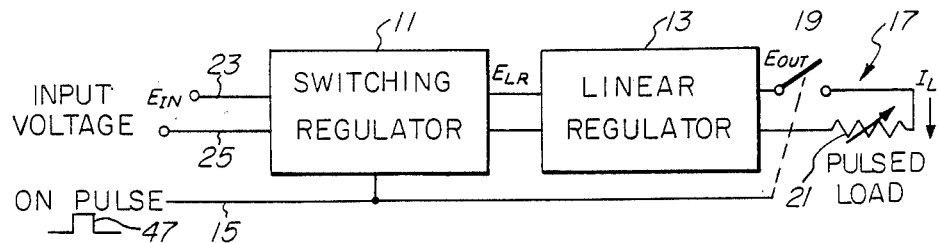
FIG. 1 is a block diagram of the preferred embodiment of the invention.

As shown in FIG. 1, the preferred embodiment includes a switching regulator 11 supplied with a source or input voltage $E_{IN}$ from a power source across its first and second inputs 23, 25. The switching regulator 11 is connected serially with a linear regulator 13 whose output is connected across a dynamic pulsed load 17. The dynamic pulsed load 17 is shown as a switch 19 and a variable resistance 21. An "on" pulse 47 activates the switch 19 over a conductor 15. The conductor 15 also supplies the "on" pulse to the switching regulator 11.

In application, the pulsed load 17 may be, for example, the bias voltage of an RF power amplifier, and the "on" pulse may be the RF drive to the power amplifier. In such an application, the regulator load current $I_L$ changes with radar pulse pattern, temperature, time and other variables. Hence, the pulsed load 17 can be defined as a resistor whose value varies from a fixed value to infinity, as occurs through operation of the switch 19, which may or may not be present in a physical embodiment.

Figure 2:
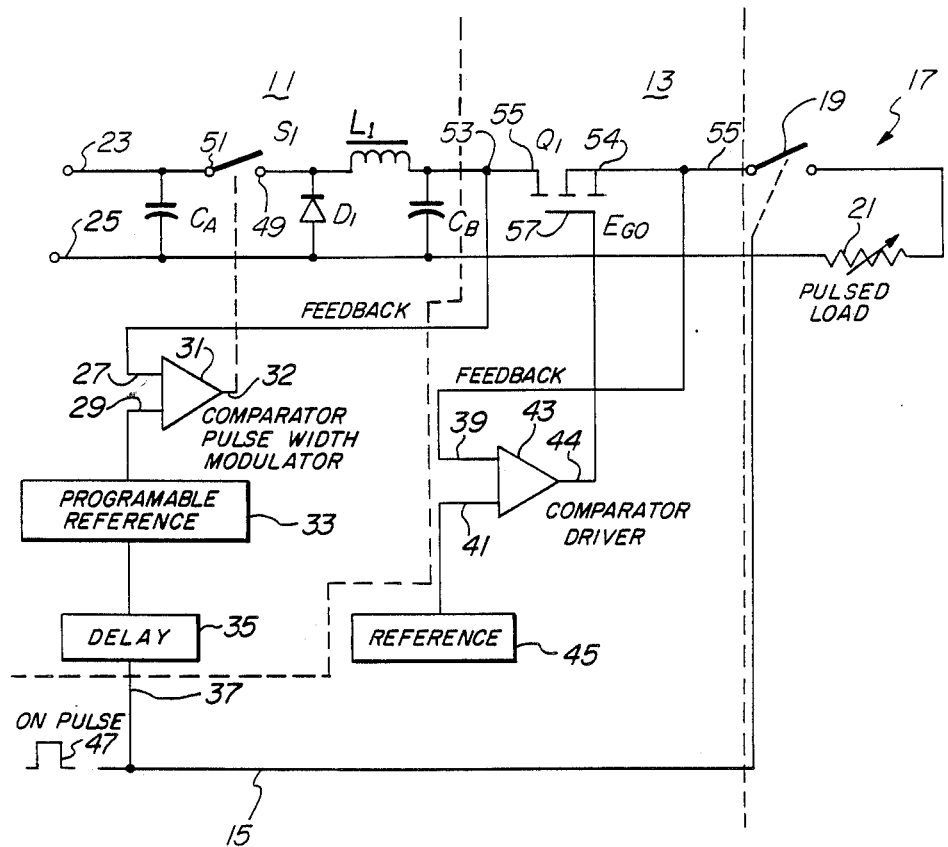
FIG. 2 is a circuit diagram illustrating the preferred embodiment of the invention.

FIG. 2 shows a generalized circuit implementation of the preferred embodiment of FIG. 1. In the switching regulator circuit 11 of FIG. 2, an input capacitor $C_A$ is connected across the input terminal lines 23, 25. One of the input terminal lines 23 also connects to the switching element $S_1$ of the switching regulator 11. When the switch $S_1$ is connected across first and second contact points 49, 51, the input voltage is supplied to a power converter circuit including a capacitor $C_B$, a diode $D_1$ and an inductor $L_1$. The cathode of the diode $D_1$ is connected electrically to the contact point 49 while the anode of the diode $D_1$ is connected to the input line 25. The inductor $L_1$ is connected from the cathode of the diode $D_1$ to the first terminal of the second capacitor $C_B$. The second terminal of the second capacitor $C_B$ is connected to the second input line 25.

The switching regulator 11 of FIG. 2 further includes a comparator/pulse width modulator 31 having first and second inputs 27, 29 respectively. The first input terminal 27 of the comparator/pulse width modulator 31 is connected to a terminal 53 which is electrically identical to the first terminal of the second capacitor $C_B$. This connection provides feedback from the output of the switching regulator 11 to the comparator/pulse width modulator 31. The second input 29 of the comparator/pulse width modulator 31 is connected to a programmable reference source 33. The programmable reference source 33 receives an input from a delay element 35, which receives the "on" pulse 47 on a conductor 37 connected to the conductor 15.

The comparator/pulse width modulator 31 produces a pulse train output signal on its output line 32 having a pulse width which varies proportionally to the departure of the input 27 of the comparator/pulse width modulator 31 from the reference level input 29. The switch $S_1$ is closed for the duration of the output pulse of the comparator pulse width modulator 31, electrically connecting the terminals 49, 51.

The linear regulator 13 is shown as including a field effect transistor (FET) $Q_1$ having a source 54, a drain 55, and a gate 57. The gate 57 of the field effect transistor $Q_1$ is connected to the output of a comparator/driver 43. A first input of the comparator/driver 43 is connected to the source 54 of the first transistor $Q_1$. The second input 41 of the comparator/driver 43 is connected to a fixed (D.C.) reference source 45.

The output of the comparator driver 43 controls the voltage applied between the gate 57 and source 54 of transistor $Q_1$. By controlling the gate to source voltage of $Q_1$, the conductance of on-resistance of the FET $Q_1$ is varied. By well-known feedback theory, the comparator/driver 43 controls the conductance or on-resistance so that the voltage at 54 (and through the load 17 when switch 19 is closed) remains constant with load current or input voltage variations. The FET $Q_1$ is illustrated as an N-channel device, which is preferred because of its lower losses. P-channel FET's, bipolar transistors or any other linear-controlled resistive element may be used.

In the embodiment of FIG. 2, the programmed voltage output of the switching regulator 11 is controlled by the internal feedback path from terminal 53 to input 27 of the comparator/pulse width modulator 31 and by the external "on" pulse 47 to provide a programmed regulated voltage to the input of the linear regulator 13. The delay provided by delay element 35 determines the time with respect to load current $I_L$ at which the switching regulator output voltage is programmed. As will be apparent to those skilled in the art, the switching device $S_1$ employed in the switching regulator 11 may be any form of switch, but is typically a transistor, either bipolar or field effect.

Figure 3:
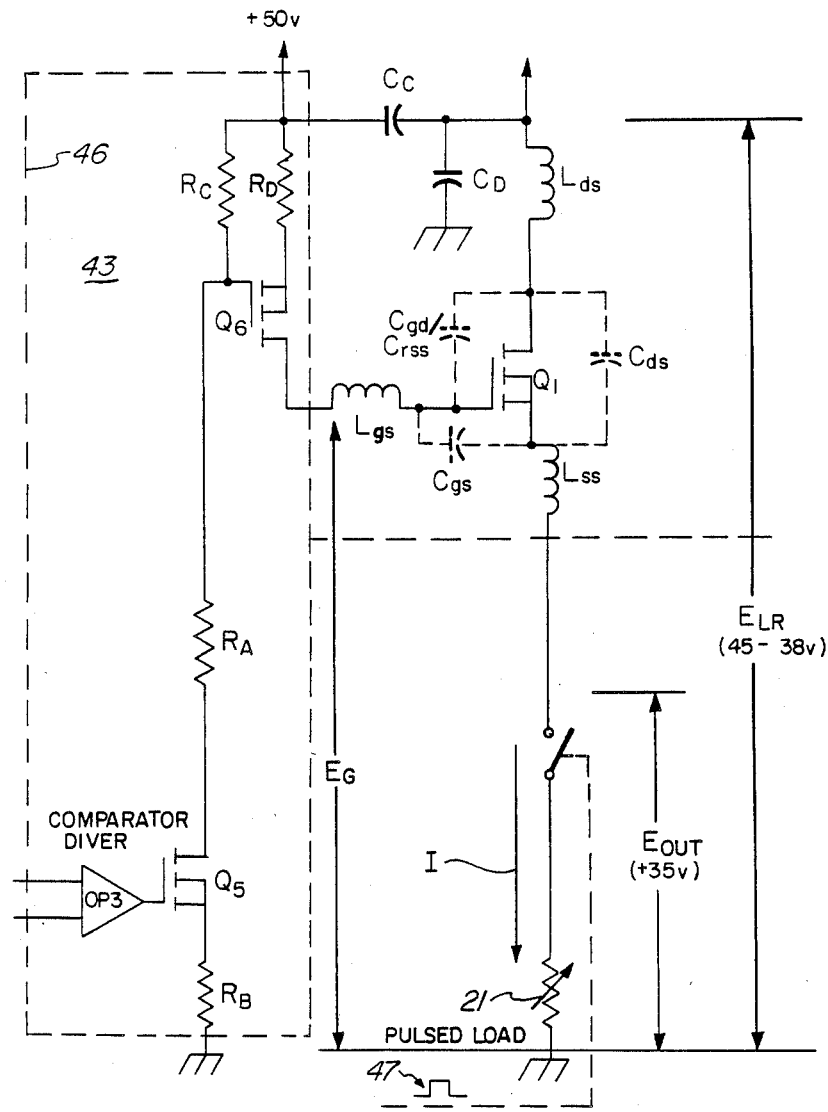
FIG. 3 is a schematic circuit diagram showing parasitic elements useful in describing the operation of the preferred embodiment.

FIG. 3 illustrates some of the stray or parasitic elements inherent to the linear regulator stage 13 and pertinent to the discussion of the preferred embodiment. The stray or parasitic elements related to the FET $Q_1$ are considered to include other strays due to physical interconnection and mountings for the purpose of this discussion. The parasitic elements shown include the Miller or gate-drain capacitance $C_{gd}/C_{rss}$, the gate inductance $L_{gs}$, a stray gate to source capacitance $C_{gs}$, a drain to source capacitance $C_{ds}$, a source inductance $L_{ss}$ and a drain inductance $L_{ds}$. In FIG. 3, the FET $Q_1$ is shown driven by a comparator/driver 43 which is contained within a dashed line 46. The comparator/driver 43 is shown including a comparator $OP_3$; first, second, third and fourth resistors $R_A$, $R_B$, $R_C$, $R_D$ and first and second drive transistors $Q_5$, $Q_6$. The resistors $R_A$, $R_B$, $R_C$, $R_D$ and drive transistors $Q_5$, $Q_6$ cooperate to perform an amplification and level shifting function on the output of the comparator $OP_3$, as discussed in more detail below.

Figure 4:
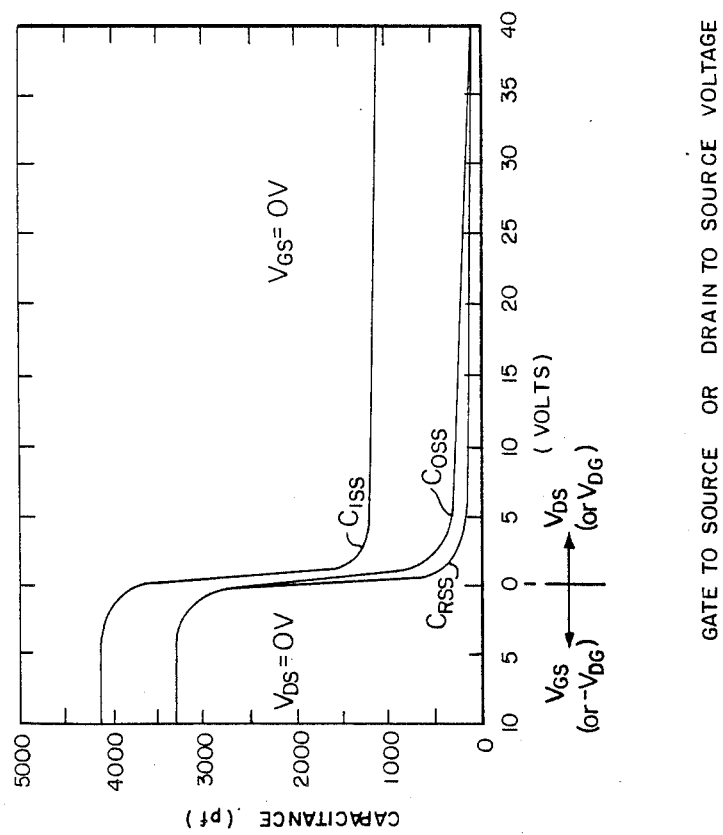
FIG. 4 shows the variance of capacitance on a vertical axis with respect to gate to source or drain to source voltage on the horizontal axis for a typical MOSFET.

As can be seen from the curves of FIG. 4, the capacitances of a field effect transistor such as transistor $Q_1$ change dramatically with element voltage in a very nonlinear manner. According to the well-known Miller effect, the feedback capacitance $C_{rss}$ is magnified by the voltage gain of the field effect transistor $Q_1$. Such nonlinear capacitance changes complicate both the drive and feedback requirements of a high stability regulator with a dynamic load. Such parasitics also have a greater affect on the regulator performance as changes in load impedance increase in magnitude and frequency.

The Miller capacitance $C_{gd/Crss}$ is probably the most harmful parasitic capacitance when high frequency performance is desired. As FIG. 4 indicates, the Miller capacitance is highest when voltage differentials are lowest or negative. Thus, as is recognized in the art, reducing the Miller Effect requires maintaining a high voltage differential (greater than five volts) across the FET $Q_1$ in a linear regulator. On the other hand, for maximum efficiency, it is necessary to keep the voltage drop across the FET $Q_1$ at a minimum when load current $I_L$ is flowing.

According to the invention, the effects of the just-described parasitics are reduced, while maintaining efficiency, by programming the input voltage to the linear regulator 13 by means of the programmed switching regulator 11. In particular, the voltage to the linear regulator 11 is programmed so that at the beginning of and during the leading edge of the load pulse across the load 17, the input voltage $E_{LR}$ to the linear regulator 11 is higher than the voltage required to supply the sum of output voltage $E_{out}$ plus the minimum conduction voltage drop of a linear regulator 13. This higher input voltage $E_{LR}$ to the linear regulator 13 provides a forcing function which increases the current flow $I_L$ in the load 17 and in the stray series inductance ($L_{ds}$, $L_{ss}$) from near zero to full load current (e.g., 30 amperes for a typical application). The resulting high drain to source voltage and high drain to gate voltage on the FET $Q_1$ reduces the effective capacities between elements, particularly the capacity between the drain and gate, i.e., the Miller capacity. Reduction in these parasitic capacitances improves the response to impedance changes of the load 17. After occurrence of the leading edge of the load pulse, the input voltage $E_{LR}$ into the linear regulator 13 is programmed down, thereby resulting in more efficient operation. These beneficial effects will be additionally explained and illustrated through the following discussion of the waveform diagrams of FIGS. 5A–5H.

FIGS. 5A–5H show several idealized waveforms referenced in FIGS. 2 and 3. FIGS. 5A–5D employ a common time scale, while FIGS. 5E–5G employ an expanded time scale for illustrative purposes. Typical voltage and current levels are also indicated on the FIGS. 5A–5H. The application of the "on" pulse 47, FIG. 5A, supplied by an external source, causes the impedance of the load 17 to drop. Current in the load 17, shown in FIG. 5C, increases at a rate determined by the parasitic impedance and the series regulating element $Q_1$. The positive going transient 71 on the output voltage $E_{out}$ of FIG. 5B and the decay 73 in output current $I_L$ at the end of the pulse 47 result from the energy stored in the stray circuit inductance $L_{gs}$, $L_{ds}$, $L_{ss}$ when the load current $I_L$ is terminated. It may be noted that the transient 71 in $E_{out}$ and the decay 73 of $I_L$ do not adversely affect performance in typical circuit applications.

Figure 5:
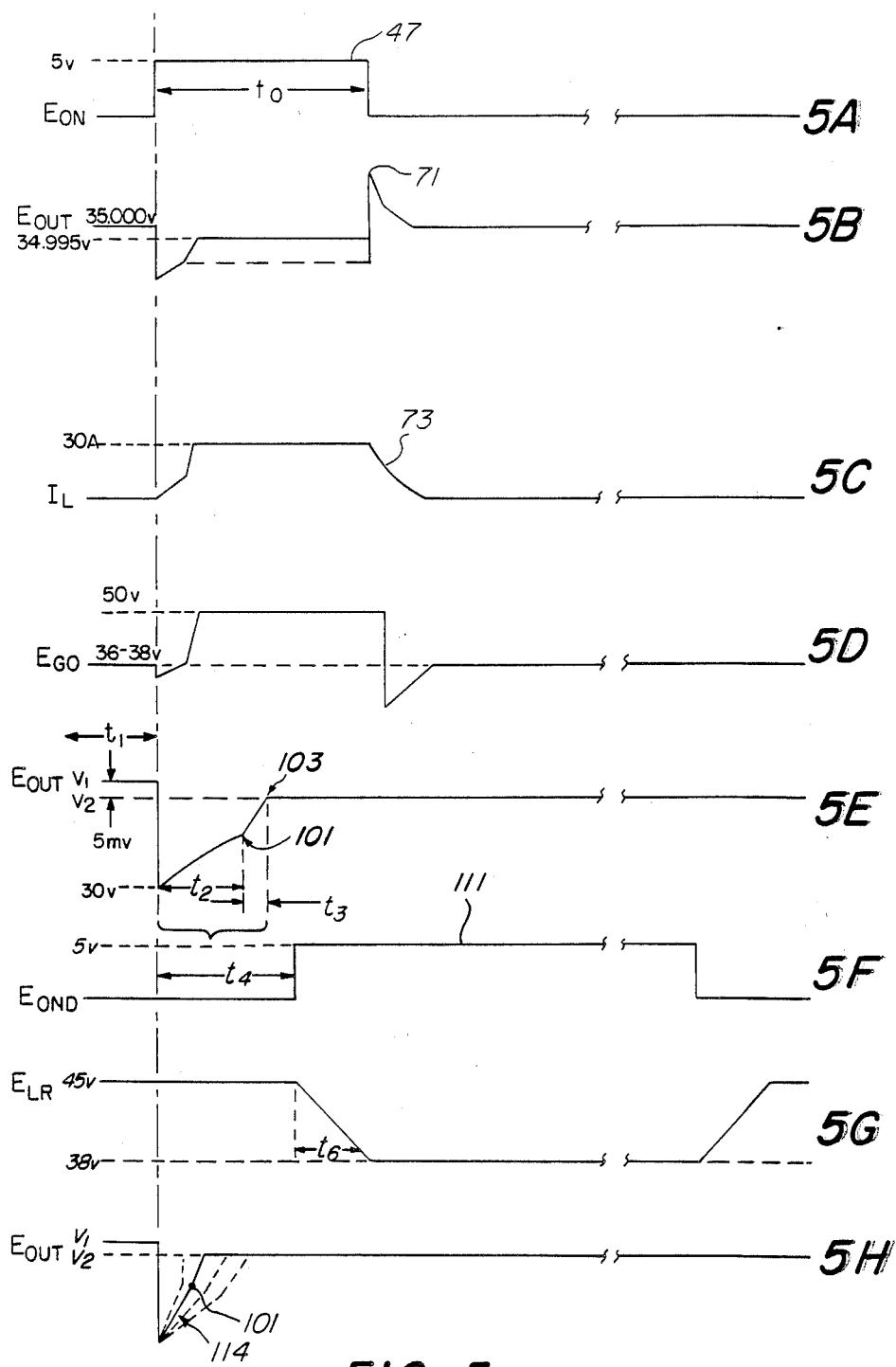
FIGS. 5A–5H illustrate waveform diagrams useful in explaining the operation of the preferred embodiment.

As indicated, FIGS. 5E, 5F and 5G show an expanded time scale in order to further illustrate the invention. During the time interval $t_1$ that the "on" pulse 47 is off, the value of $E_{out}$ is at a first voltage level $V_1$, which may be, for example, 35 volts. During time interval $t_2$, the output voltage $E_{out}$ initially drops to, for example, 30 volts, due to circuit inductance and resistances, as current begins to flow in the series inductance $L_{ds}$, $L_{ss}$. The output voltage $E_{out}$ then rises to point 101. Beyond point 101' the feedback comparator/driver 43 gains control of the on-resistance of $Q_1$, lowering the on-resistance of $Q_1$ and thereby increasing the rate of change in the output voltage. The output voltage $E_{out}$ therefore increases more rapidly during the time interval $t_3$ beyond point 101, until, at point 103, the voltage $E_{out}$ reaches its stable value $V_2$, for example 34.995 volts. The difference ($V_1-V_2$) in $E_{out}$ during the off-time interval $t_1$ and after it reaches stability during the "on" pulse 47 is determined by the DC or low frequency gain of the comparator driver 43 and the FET $Q_1$. A typical value for this difference $V_1-V_2$ is five milivolts, while illustrative values for $t_2$ and $t_3$ are 0.12 and 0.07 microseconds, respectively.

The programmed input voltage $E_{OND}$ is illustrated in FIG. 5F. As may be seen, it comprises a voltage pulse 111 of the same duration $t_o$ as the "on" pulse 47 of FIG. 5A and delayed by an interval $t_4 \geq t_2 + t_3$ from the beginning of the "on" pulse 47. The corresponding voltage $E_{LR}$ into the linear regulator 13 is shown in FIG. 5G. The shift in reference voltage on line 29 into the comparator pulse width modulator 32 provided by the rise in the delayed voltage pulse $E_{OND}$ linearly turns down or decreases the voltage $E_{LR}$ into the linear regulator 13 over a time interval $t_6$, as shown in FIG. 5G. At the end of the "on" pulse 47, the programmed voltage, $E_{OND}$, is shifted back down to its "off time" setting.

The input voltage $E_{LR}$ to the linear regulator 13 is programmed to decrease over an interval $t_6$ at a rate which is slow compared to the transient response time of the linear regulator 13 that is required to accommodate the initial load current transient. By way of illustration, interval $t_6$ may be on the order of 1–5 microseconds. The slow reduction in the input voltage to the linear regulator 13 does not demand the high drive current that would be required to maintain the fast response at high efficiency if the input voltage $E_{LR}$ (and drain to source voltage) changed rapidly.

The last waveform, FIG. 5H, illustrates the effect of the programmed input voltage. In general, the response time, or time to reach the stable operating voltage $V_2$, decreases as the magnitude of the forcing function $E_{LR}-E_{out}$ increases. The initial rate of rise 114 of output voltage is faster due to a higher forcing voltage ($E_{LR}-E_{out}$). The rate of rise of the output voltage to the regulation level $V_2$ is also faster due to the fact that the higher input voltage during this interval causes the gate to drain capacitance $C_{gd}$ and the gate to source capacitance $C_{gs}$ to be lower, requiring less drive current and less change in gate to source drive voltage for a given load current.

With respect to the Miller Effect, the curves of FIG. 4 show that typical values for Ciss + Crss changes from approximately 1400 $pf+100$ $pf=1500$ $pf$ to 4200 $pf+3200$ $pf=7400$ $pf$ as the drain to source voltage becomes less than 5 volts. Therefore, for a given driver 43 of FIG. 3, the response time is increased by a factor of 7400 $pf/1500$ $pf=5$ as a minimum. When the increase in $C_{rss}$ due to the gain of the transistor stage (typically greater than ten) is considered, the response time of the regulator 13 becomes proportionally slower. Thus, maintaining $E_{LR}-E_{out}$ greater than five volts considerably reduces response time.

As indicated, programming down of the voltage $E_{LR}$ into the linear regulator 13 as in FIG. 5G improves efficiency. For example, programming $E_{LR}$ down 7 volts during the load pulse results in a net reduction of 7 volts times 30 amperes or 210 watts. This is a significant saving in power from the illustrative typical output power of 35 volts times 30 amperes or 1050 watts.

Figure 6:
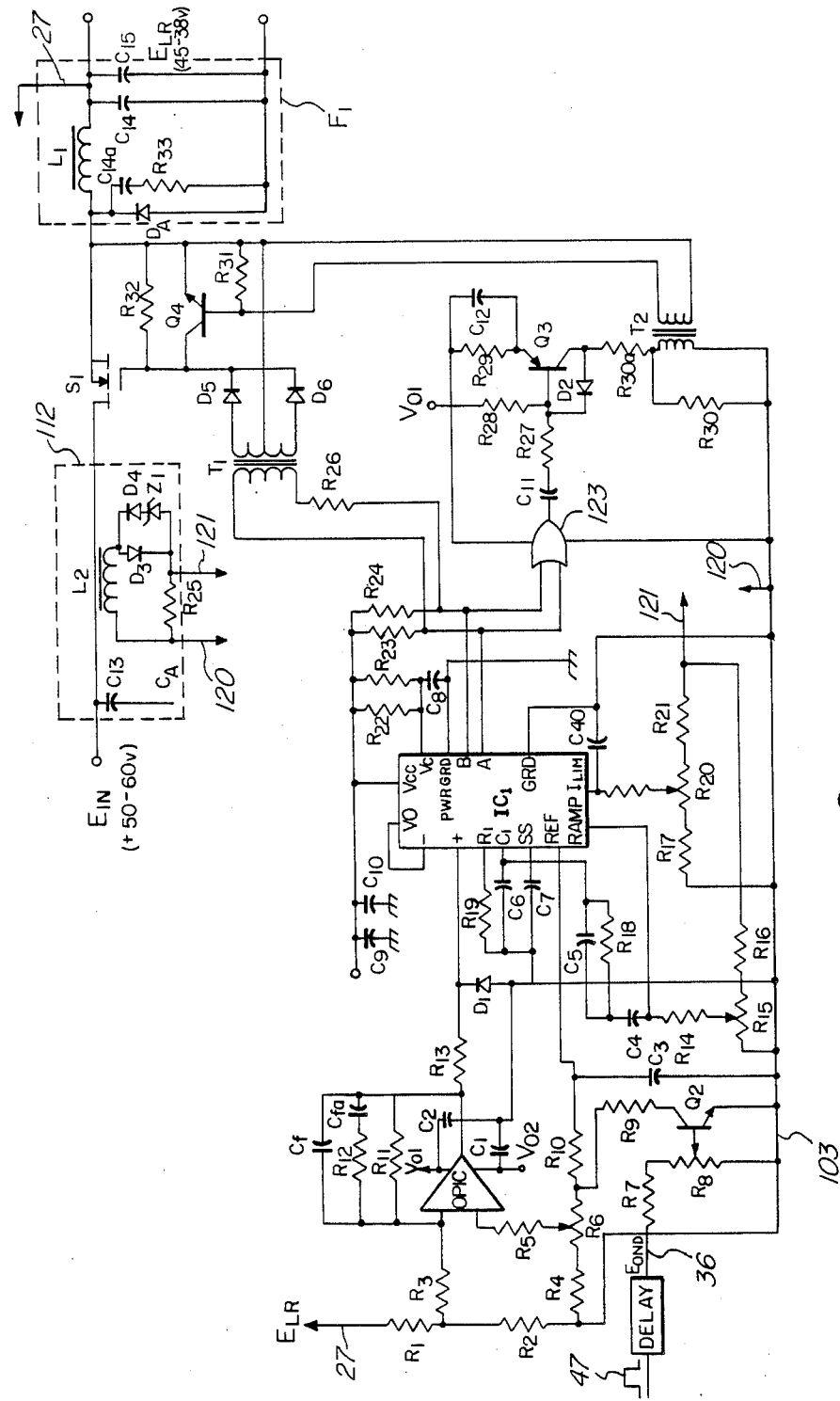
FIG. 6 is a circuit diagram of a switching regulator employable according to the preferred embodiment.

FIG. 6 shows a detailed circuit schematic diagram of a switching regulator 11 according to the preferred embodiment. In this circuit, a FET switch $S_1$ is controlled by a pulse width modulator $IC_1$, in response to the output of a comparator OPIC. The FET switch $S_1$ may be, for example, an IR 540 FET.

The output voltage of the switching regulator 11, which is the input voltage $E_{LR}$ into the linear regulator, is fed back on line 27 to a pulse width modulator comparator OPIC through a resistive divider network including resistors $R_1$, $R_2$, and $R_3$. The voltage $E_{OND}$ (FIG. 5F) is applied on a line 36 through a resistor $R_7$ and a variable resistor $R_8$ to the base of a transistor $Q_2$, which may be, for example, a 2N2222 transistor. The transistor $Q_2$ shifts the current drawn through a reference voltage divider formed by resistors $R_{10}$, $R_6$, $R_4$. The reference voltage supplied to the divider emanates from the REF terminal of the pulse width modulator integrated circuit $IC_1$, which is connected to one terminal of a capacitor $C_3$, whose other terminal is connected to common. The shift in current provided by the transistor $Q_2$ in response to the delayed "on" pulse $E_{OND}$ causes a reduction (programming) of the voltage at the junction of the resistors $R_5$, $R_6$, which is the input to the comparator OPIC. The change in output of the comparator OPIC causes modulator $IC_1$ to reduce the voltage $E_{LR}$, as illustrated in FIG. 5G.

The comparator OPIC may be an HA2540 operational amplifier and is provided with a typical feedback network from its output to its input including resistors $R_{11}$, $R_{12}$ and capacitors $C_f$ and $C_{fa}$. The comparator $OP_1$ is further shown connected to respective bias voltages $V_{01}$ and $V_{02}$, which may for example be 15 volts and $-15$ volts, respectively. The bias lines to the voltage sources $V_{01}$ and $V_{02}$ are respectively connected to filter capacitors $C_1$ and $C_2$, which are commonly connected to a line 103.

The output of the comparator OPIC is fed through a resistor $R_{13}$ to the input of the pulse width modulator integrated circuit $IC_1$, which may be, for example, an UC1825 integrated circuit. The output of the pulse width modulator $IC_1$ supplies a pulse width modulated driving pulse to the switch (FET) $S_1$ through a transformer $T_1$. As is known in the art, the pulse width modulator $IC_1$ controls the width of this driving pulse in accordance with the output of the comparator OPIC. The operating frequency of $IC_1$ is set by selection of a resistor $R_{19}$ and capacitor $C_6$, as known in the art. Capacitor $C_7$ is connected to provide a "soft start" function, also as known in the art.

Associated with the modulator $IC_1$ is a biasing network including capacitors $C_8$, $C_9$, $C_{10}$, and resistors $R_{22}$, $R_{23}$, $R_{24}$. The bias voltage $V_{01}$ is connected to the $V_{cc}$ bias input of the pulse width modulator $IC_1$, and to each of the first terminals of the capacitors $C_9$, $C_{10}$ and the resistors $R_{22}$, $R_{23}$, $R_{24}$. The second terminals of the capacitors $C_9$ and $C_{10}$ are grounded, while the second terminal of the resistor $R_{22}$ is connected to the $V_c$ input of the pulse width modulator $IC_1$. The resistor $R_{22}$ is also connected through the bypass capacitor $C_8$ to the power ground terminal of the pulse width modulator integrated circuit $IC_1$. The resistors $R_{23}$ and $R_{24}$ are respectively connected to the A and B outputs of the pulse width modulator $IC_1$.

Current feedback or current mode control circuitry is also connected to the integrated circuit pulse width modulator $IC_1$ to enhance the stability of the feedback loop, and particularly to reduce the effect of the output filter $L_1$, $C_{14}$, $C_{15}$ on feedback stability. Accordingly, current sensing circuitry 112 including a current transformer $L_2$ is connected to the $E_{IN}$ line 23 to derive a current feedback signal in cooperation with diodes $D_3$, $D_4$, zener diode $Z_1$ and a resistor $R_{25}$.

The first output 121 of the current sensing circuitry 112 is connected through an adjustable resistive voltage divider comprising resistors $R_{21}$, $R_{20}$, $R_{17}$ to the current limit ($I_{lim}$) input of the pulse width modulator $IC_1$. The voltage at the $I_{lim}$ input is compared internally to a reference voltage. When the $I_{lim}$ voltage exceeds the internal reference voltage, the output A and B of the integrated circuit of $IC_1$ are removed, which turns off the switch $S_1$. This operation provides over current protection for the regulator.

The second output of the current sensing circuitry 112 is connected through a variable resistor network comprising resistors $R_{16}$, $R_{15}$, to the ramp input of the integrated circuit $IC_1$ through a resistor $R_{14}$ and to the $C_1$ input of $IC_1$ through a capacitor $C_4$ and the parallel combination of capacitor $C_5$ and $R_{18}$. As is well known in the art, the effect of the current feedback to the ramp and $C_1$ inputs is to effectively reduce the two-pole network comprising inductance $L_1$, and capacitors $C_{14}$, $C_{15}$ to a single pole network. This makes the necessary compensation of the regulator easier and enables improved performance.

The outputs A, B of the pulse width modulator integrated circuit $IC_1$ are also supplied to circuitry which assists in turning off the FET switch $S_1$. The circuitry includes an OR gate 123, a transistor $Q_3$, and a transistor $Q_4$. When both outputs A and B of the pulse width modulator integrated circuit $IC_1$ are low, the low signal at the output of the OR gate is coupled through a differentiating capacitor $C_{11}$ and a resistor $R_{27}$ to the base of the transistor $Q_3$ which may be, for example, a 2N5583. This low signal at the base of the transistor $Q_3$ turns on transistor $Q_3$, connecting transformer $T_2$ to the bias voltage $V_{01}$ through two resistors $R_{30a}$, $R_{29}$ and a capacitor $C_{12}$. The positive voltage applied to the transformer $T_2$ when the transistor $Q_3$ is turned on is coupled to the base of the transistor $Q_4$, a 2N3507, and to a resistor $R_{31}$. This coupled voltage causes the transistor $Q_4$ to conduct, connecting the gate of the switch $S_1$ to its source. This connection turns off the switch $S_1$ by discharging its input capacity, thereby removing the gate voltage. The resistors $R_{30}$ and $R_{31}$ provide a discharge path for the energy stored in the primary inductance of the transformer $T_2$ during the "on" pulse. The resistor $R_{31}$ also provides a low impedance path between the base and emitter of the transistor $Q_4$ to assure that the transistor $Q_4$ remains off except when it is being driven by the transformer $T_2$. The resistor $R_{32}$ provides a low impedance path from the gate of the switch $S_1$ to its source in order to assure that the switch $S_1$ is not turned on by drain to gate leakage currents.

The field effect transistor switch $S_1$ is connected to a power converter filter $F_1$. This filter $F_1$ includes an inductor $L_1$, two capacitors $C_{14}$, $C_{15}$, a diode $D_1$, a resistor $R_{33}$ and a capacitor $C_{14a}$. A cathode of the diode $D_1$ and one terminal of the capacitor $C_{14a}$ are connected to the output of the FET switch $S_1$. The capacitors $C_{14}$ and $C_{15}$ are connected to the output of the inductor $L_1$. The anode of the diode $D_1$, one terminal of the resistor $R_{33}$ and the opposite terminal of the capacitors $C_{14}$ and $C_{15}$ are connected in common. The output of the power converter filter $F_1$ is the voltage $E_{LR}$ supplied to the linear regulator 13.

Figure 7:
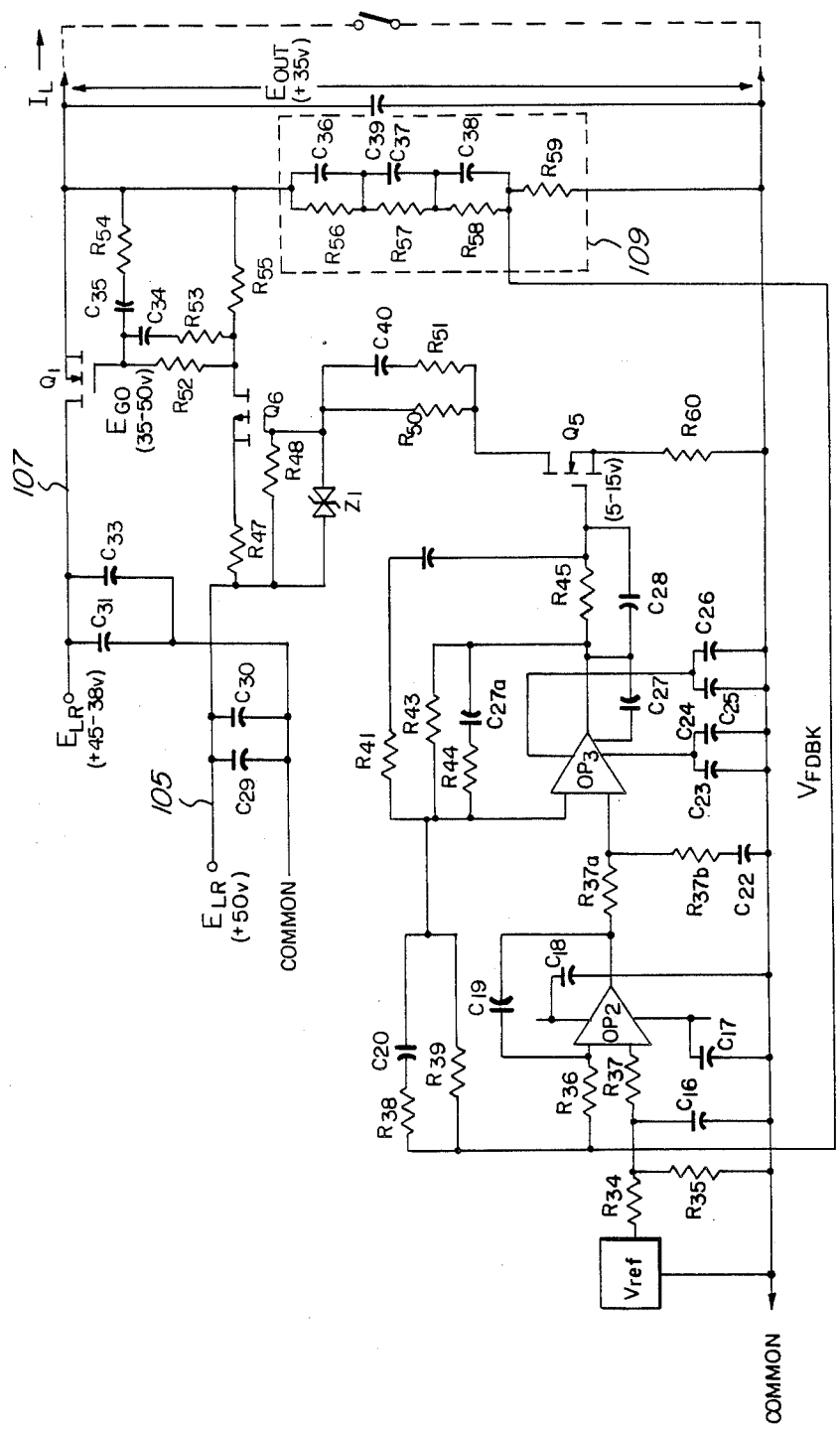
FIG. 7 is a circuit diagram of a linear regulator employable according to the preferred embodiment.

A schematic of a specific linear regulator circuit 13 according to the preferred embodiment is illustrated in FIG. 7. In general, according to this circuit, the output voltage $E_{out}$ is controlled by the transistor (FET) $Q_1$. A feedback signal $V_{FDBK}$ is connected to a low frequency operational amplifier $OP_2$ and to an operational amplifier $OP_3$ which has the wide bandwidth necessary to obtain the required fast transient response. The low frequency amplifier $OP_2$ supplies a highly stable reference voltage to the second input of the wideband operational amplifier $OP_3$. The output of the wideband operational amplifier $OP_3$ controls the transistor $Q_1$ through a driver and voltage translator network including fifth and sixth transistors $Q_5$, $Q_6$. The operational amplifiers $OP_2$ and $OP_3$ may respectively be an LM 118 and an OptoElectronic 9914A operational amplifier. A more detailed discussion of this circuitry will now be presented.

The second, low frequency operational amplifier $OP_2$ is supplied with a fixed voltage reference $V_{ref}$ through a network including three resistors $R_{34}$, $R_{35}$, $R_{37}$ and a capacitor $C_{16}$. The second input to the operational amplifier $OP_2$ is the feedback reference voltage $V_{FDBK}$, which is supplied through a resistor $R_{36}$. The bias terminals of the amplifier $OP_2$ are connected to a common line through bypass capacitors $C_{17}$, $C_{18}$. A feedback capacitor $C_{19}$ connects the output of the operational amplifier $OP_2$ to its first input. The feedback network around operational amplifier $OP_2$ further includes a resistor $R_{39}$, a resistor $R_{38}$ and a capacitor $C_{20}$, which supply the required high frequency feedback signal to the inverting input of the wideband operational amplifier $OP_3$.

The output of the operational amplifier $OP_2$ is connected to the noninverting input of the third operational amplifier $OP_3$ through a network including two resistors $R_{37a}$, $R_{37b}$ and a capacitor $C_{22}$. Feedback to the second input of the operational amplifier $OP_3$ is also provided by a feedback network comprising a capacitor $C_{27a}$, a resistor $R_{44}$, a resistor $R_{43}$ and resistors $R_{41}$, $R_{42}$, which comprise standard operational amplifier stabilizing circuitry.

Bias voltage to the operational amplifier $OP_3$ is bypassed by first and second pairs of capacitors $C_{23}$, $C_{24}$ and $C_{25}$, $C_{26}$. One of the capacitors of each pair performs a high frequency filter function, while the other capacitor performs a low frequency filtering function. Such pairs of capacitors will be noted elsewhere in the circuitry. They are not required on the operational amplifier $OP_1$ because that amplifier $OP_1$ has gain only at DC and low frequencies. The gain of this amplifier falls to zero typically at frequencies of a few tens of hertz.

The output of the operational amplifier $OP_3$ is connected through a resistor $R_{45}$ to the gate of feedback transistor $Q_5$. A capacitor $C_{27}$ provides internal frequency compensation of the operational amplifier $OP_3$, and a capacitor $C_{28}$ provides a peaking or differentiated drive to $Q_5$, which assists in obtaining a fast transient response from the regulator.

As before indicated, the field effect transistors $Q_5$, $Q_6$ provide a driving and voltage translation function with respect to the transistor $Q_1$. This function is provided in order to translate from near 5-15 volts to the operating voltage of $Q_1$, which may be on the order of 35 volts, for example. Accordingly, the source of the FET $Q_5$ is connected through a resistor $R_{60}$ to common. The drain of the FET $Q_5$ is connected to the gate of the FET $Q_6$ through a network including resistor $R_{51}$ and a capacitor $C_{40}$, which provides appropriate biasing for the FET $Q_5$.

The FET $Q_6$ is biased by a voltage of $E_{LR}$ plus V applied on a line 105 to a biasing network including resistors $R_{47}$ and $R_{48}$. Resistors $R_{47}$ and $R_{48}$ apply the bias voltage $E_{LR}$ to the source of the transistor $Q_6$, while the resistor $R_{48}$ is connected between the bias voltage source $E_{LR}+V$ and the gate of the FET $Q_6$. The FET $Q_6$ is protected against transients by a bidirectional zener diode $Z_1$ connected from its gate to the source of bias voltage $V_{in}+V$. Capacitors $C_{29}$, $C_{30}$ are connected from the common line to the bias voltage source line 105 and provide respective low and high frequency filtering functions. The drain of the FET $Q_6$ is connected through a resistor $R_{52}$ to drive the gate of the FET switch $Q_1$. Additional driving circuitry includes a resistor $R_{53}$ in series with a capacitor $C_{34}$ connected across the resistor $R_{52}$, a resistor $R_{55}$ connected from the drain of the FET $Q_6$ to the source of the FET $Q_1$, and a capacitor $C_{35}$ in series with a resistor $R_{54}$ connected from the gate of the field effect transistor $Q_1$ to its source.

As before indicated, the input voltage $E_{LR}$ to the field effect transistor $Q_1$ is applied to its drain on a line 107. This line 107 is connected to common through first and second capacitors $C_{31}$, $C_{33}$, which are again respective low and high frequency filtering capacitors. The capacitors $C_{29}$, $C_{30}$ filter an external DC offset voltage on the order of 20 volts in a typical application. The output of the linear regulator circuit 13 appears across a capacitor $C_{39}$ which is connected from the output of the FET $Q_1$ to the common line. The source of the FET $Q_1$ is also connected to a voltage feedback divider circuit 109. This circuit includes four series connected resistors $R_{56}$, $R_{57}$, $R_{58}$, $R_{59}$. Each of three of the resistors $R_{56}$, $R_{57}$, $R_{58}$ has a respective capacitor $C_{36}$, $C_{37}$, $C_{38}$ connected in parallel therewith. As indicated, the feedback voltage $V_{FDBK}$ is taken from the connection point of the resistors $R_{58}$ and $R_{59}$. In this manner, the operational amplifier $OP_3$ monitors the output voltage level and generates outputs required to control the transistor $Q_1$ such that the desired output voltage $E_{out}$ is maintained. The voltage feedback dividing network reduces the voltage $E_{out}$ across the output terminals to a level on the order of 10 volts.

A method has thus been shown of reducing or neutralizing the degrading effects of the drain to gate and gate to source capacitance when attempting to provide fast (e.g., 10–100 nanosecond) response from a voltage regulator operating into a dynamic or pulsed load at high efficiency. The performance improvement offered from this invention has been observed in breadboard operation.

Figure 8:
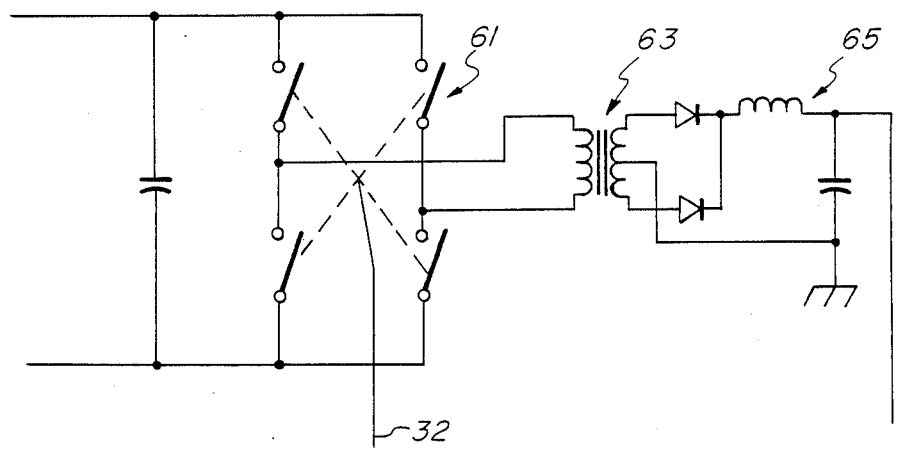
FIGS. 8 and 9 illustrate alternate embodiments of switching regulators employable with the preferred embodiment.
Figure 9:
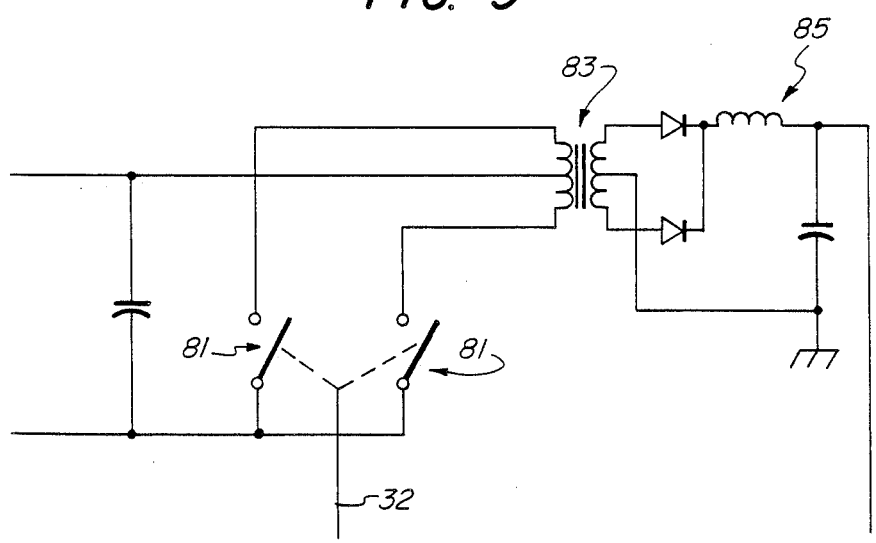

FIGS. 8 and 9 disclose alternative embodiments of switching regulators which may be used with the linear regulator of FIG. 2. In FIG. 8 the output 32 of the comparator/pulse width modulator 31 is shown driving a full bridge transformer converter, which, as is well-known in the art, includes a switching section 61, a transformer 63, and a filter 65. FIG. 9 illustrates the output 32 of the comparator/pulse width modulator 31 driving a push-pull forward converter, another well-known switching regulator circuit employing two-switching elements 81, connected to a transformer 83, which outputs to a filter 85. Many other varieties of switching regulators may be used according to the invention including various pulse width modulator based converters, as well as resonant converters. Many other varieties of series linear regulators are also known, and the invention is not limited to any one particular circuit.

It may be further noted that the "on" pulse 47 need not be coterminous with the load pulse. The "on" pulse may continue after termination of the load pulse. It may also start after occurrence of the load pulse. However, such delay will result in unnecessary power loss.

It will be apparent to those skilled in the art that the just-described preferred embodiment is subject to numerous modifications and adaptations without departing from the scope and spirit of the invention. Therefore it is to be understood that, within the scope of the appended claims, the invention may be practiced other than as specifically described herein.

What is claimed is:

1. A voltage regulator for regulating voltage applied to a load from an input voltage source supplying a source voltage, said load being activated during occurrence of a load pulse, comprising:

a first voltage regulator means supplied with an input voltage at an input and connected to said load for regulating voltage applied to said load, said first voltage regulator means exhibiting a response time which decreases with increase in input voltage to said first voltage regulator means and power consumption which increases with increase in input voltage to said first voltage regulator means; and a programmed voltage regulator means connected to said input voltage source and to the input of said first voltage regulator means for controlling the input voltage to said first voltage regulator means, said programmed voltage regulator means supplying an increased input voltage to said first voltage regulator means at the beginning of said load pulse to provide faster response and thereafter reduces the input voltage to said first regulator means to reduce power consumption.

2. The voltage regulator of claim 1 wherein said programmed voltage regulator means is responsive to a pulse which occurs after said load pulse to reduce the input voltage to said first voltage regulator means.

3. The voltage regulator of claim 2 wherein said first voltage regulator means includes a switching means connected to its input and to said load for controlling the voltage supplied to said load.

4. The voltage regulator of claim 3 wherein said switching means comprises transistor means and wherein said increased input voltage at the beginning of said load pulse reduces parasitic effects associated with said transistor means.

5. The voltage regulator of claim 4 wherein said transistor means comprises a field effect transistor and wherein said increased input voltage reduces Miller Effect capacitance of said field effect transistor.

6. The voltage regulator of claim 5 wherein said input voltage is controlled by said switching regulator to maintain a voltage differential across said field effect transistor greater than five volts at the beginning of said load pulse.

7. The voltage regulator of claim 1 wherein said first voltage regulator means comprises a linear voltage regulator.

8. The voltage regulator of claim 7 wherein said programmed voltage regulator means comprises a programmed switching regulator.

9. The voltage regulator of claim 8 wherein said linear regulator includes a switching means connected to the input to said linear regulator and to said load for controlling the voltage supplied to said load.

10. The voltage regulator of claim 9 wherein said switching means comprises a field effect transistor and wherein said increased input voltage at the beginning of said load pulse reduces parasitic effects of said field effect transistor.

11. The voltage regulator of claim 10 wherein said increased input voltage reduces Miller Effect capacitance.

12. The voltage regulator of claim 11 wherein said input voltage is controlled by said switching regulator to maintain a voltage differential across said field effect transistor greater than five volts at the beginning of said load pulse.

13. The voltage regulator of claim 12 wherein said linear regulator supplies a load current to said load and wherein said input voltage to said linear regulator is reduced to a value which is the minimum required to support the load current.

14. The voltage regulator of claim 13 wherein said input voltage to said linear regulator is reduced to said minimum value at a rate which is slow in comparison to the transient response of said linear regulator.

15. The voltage regulator of claim 8 wherein said programmed voltage regulator means comprises:

means supplied with said source voltage and responsive to a control signal for controlling the level of the input voltage to said linear regulator; and means for selectively supplying said control signal to said switching means so as to supply an increased voltage to the input of said linear regulator during said load pulse and thereafter to reduce the input voltage to said linear regulator.

16. The voltage regulator of claim 15 wherein said means for selectively supplying comprises:

comparator pulse width modulator means having an output connected to said controlling means, and first and second inputs, said first input being connected to the input of said linear regulator; and a programmed voltage reference source connected to said second input of said comparator pulse width modulator.

17. The voltage regulator of claim 16 wherein said programmed voltage reference source comprises:

delay means for receiving a pulse and outputting a delayed pulse; and reference voltage source means for supplying a reference voltage to said second input of said comparator pulse width modulator means and for reducing said reference voltage in response to said delayed pulse.

18. The voltage regulator of claim 17 wherein said reference voltage source means reduces said reference voltage to a second voltage level for substantially the duration of said load pulse.

19. In a voltage regulator for regulating voltage supplied to a load which is activated during a load pulse and wherein said voltage regulator exhibits a response time which decreases with increase in input voltage to said regulator and power consumption which increases with increase in input voltage, the improvement comprising:

means for supplying an increased input voltage to said voltage regulator at the beginning of said load pulse to provide faster response and thereafter reducing said input voltage to reduce power consumption.

* * * * *